United States Patent Office 3,467,763
Patented Sept. 16, 1969

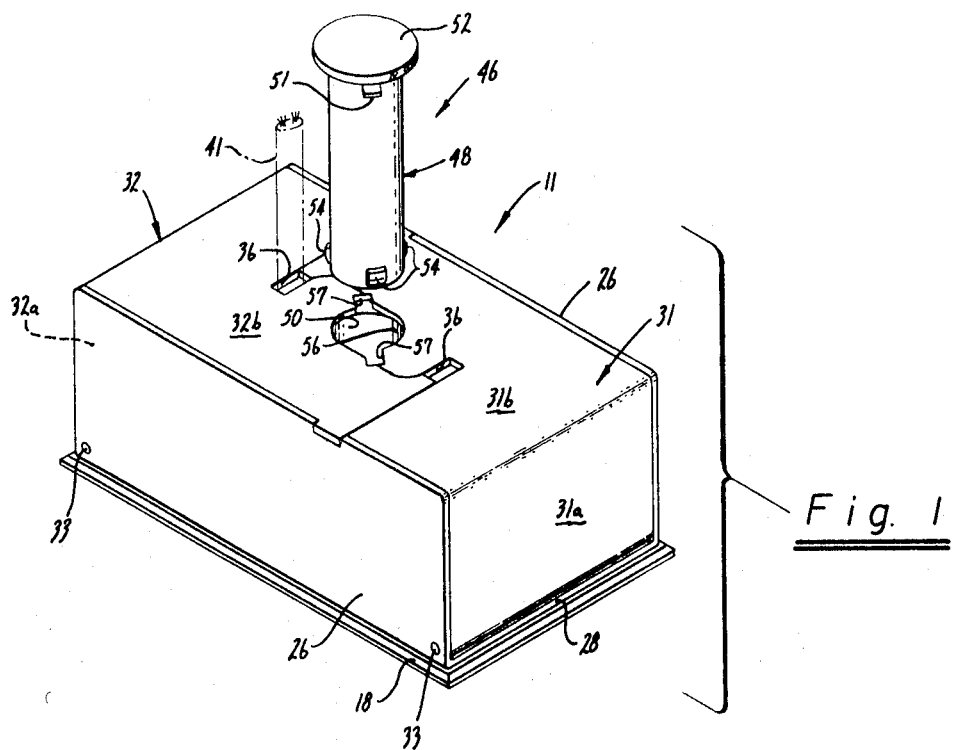

3,467,763
SAFETY COVER FOR ELECTRICAL OUTLETS
Howard G. Shaw, 24 Walnut Ave., Ross, Calif. 94957
Filed Aug. 15, 1967, Ser. No. 660,768
Int. Cl. H05k 5/03
U.S. Cl. 174—67                              7 Claims

ABSTRACT OF THE DISCLOSURE

Safety cover for electrical outlets which can be mounted on the electrical outlet without changing the same and in which locking means has been provided to prevent the same from being opened by children.

Background of the invention

This invention relates to a safety cover for protecting children from electrical outlets. Although devices have been provided for protecting children from electrical outlets, such devices have not been particularly satisfactory because they have been fragile and have provided inadequate protection. They also have been inconvenient to install and use.

Summary of the invention

The safety cover is for use with an electrical outlet of the type which consists of a box in which a receptacle is provided which has at least one electrical outlet and a cover plate which is secured to the box and overlying the receptacles and provided with holes to permit access to the outlets. The safety cover consists of a member which is carried by the receptacle and which overlies the plate. Cover means is secured to the member and closes the outlet openings in the plate. Removable locking means is secured to the member and to the cover means for preventing opening of the cover means. The cover means is formed to provide a space between the cover means and the plate to accommodate plugs mounted in the outlets of the receptacle. The cover means also includes an opening through which the cord can extend so that power can be obtained from the outlet while the safety cover is in place.

In general, it is an object of the present invention to provide a safety cover which can be utilized for electrical outlets for protecting children, while at the same time permitting use of the same.

Another object of the invention is to provide a safety cover of the above character which can be readily mounted upon the electrical outlet without modification.

Another object of the invention is to provide a safety cover of the above character which prevents the plugs from being disconnected while the safety cover is in place.

Another object of the invention is to provide a safety cover of the above character which can be readily opened to permit a plug to be inserted in or removed from the outlet covered by the safety cover.

Another object of the invention is to provide a safety cover of the above character which is relatively inexpensive and which can be readily manufactured.

Additional objects and features of the invention will appear from the following description in which the preferred embodiment is set forth in detail in conjunction with the accompanying drawings.

Brief description of the drawings

FIGURE 1 is an isometric view of a safety cover for an electrical outlet incorporating the present invention mounted upon an electrical outlet.

FIGURE 2 is a cross-sectional view of the safety cover shown in FIGURE 1 mounted upon an electrical outlet.

FIGURE 3 is a detail view looking along the line 3—3 of FIGURE 2.

Description of the preferred embodiment

The safety cover or enclosure 11 is mounted on an electrical outlet 12 of a conventional type. As is well known to those skilled in the art, such an electrical outlet consists of a box 13 which is adapted to be mounted in the wall or floor of a room. A receptacle 14 of a conventional type, such as one which is provided with a pair of female receptacles 16, is mounted within the box and is secured to the box by screws 17. A cover plate 18 is mounted on the receptacle 14 by a screw 19 and is provided with openings 21 through which the receptacle 14 extends.

The safety cover or enclosure 11 consists of a pair of spaced parallel side walls 26 which are joined together by end strips 27 and 28 and by an intermediate strip 29. Strips 27, 28 and 29 together can be termed a member or base portion. A pair of cover sections 31 and 32 is provided. The cover sections are substantially L-shaped in side elevation as shown in FIGURE 2. The lower extremities of the cover sections 31 and 32 are turned inwardly and carry rods 33 which are pivotally mounted in the side walls 26 to form hinges for the cover sections 31 and 32. The cover sections 31 and 32 are provided with portions 31a, 31b, and 32a, 32b, respectively, in which the portions 31a and 32a form the end walls, whereas the side walls 26 form the side walls of a four-sided rectangular enclosure and in which the portions 31b and 32b form the top side of the enclosure. As can be seen from FIGURE 1, the portions 31b and 32b of the cover sections 31 and 32 are generally L-shaped in plan and are adapted to cooperate with each other so that one leg of each L-shaped section is adjacent the corresponding leg of the other L-shaped section when they are in a closed position so as to provide two spaced openings 36 which generally overlie the female outlets 16. Alternatively, the safety cover can be formed of a suitable flexible plastic such as polypropylene. In such event, the strips 27 and 28 can be formed integral with the cover sections 31 and 32 so that the hinge pins 33 can be eliminated. Since the plastic is flexible, the sections 31 and 32 can still be pivoted with respect to the strips 27 and 28.

As can be seen particularly from FIGURE 2, the safety cover 11 is adapted to be secured to the cover plate 18 by the screw 19 which extends through the intermediate strip 29 and fastens the safety cover 11 as well as the cover plate 18 to the receptacle 14. It can be seen that the safety cover 11 is formed in such a manner so that there is sufficient space provided between the portions 31b and 32b to accommodate plugs such as the plug 38 which is provided with a pair of male prongs disposed within the female receptacle 16. The plug 38 is connected to a cord 41 which extends through the hole 36 overlying or in line with the receptacle in which the plug 38 is mounted. Similarly, if desired, another plug can be mounted in the other female receptacle and have its cord extend through the other opening 36. The safety cover 11 is sized so that once the plugs are in place they cannot become disconnected from the outlet unless the cover sections 31 and 32 are opened.

Removable locking means 46 is secured to the intermediate strip 29 or is secured to the cover plate 18 or the receptacle 14 and engages the cover sections 31 and 32 to prevent opening of the same to thereby prevent children from gaining access to the electrical outlet 12 or to the plug 38 which is disposed in the outlet. The locking device 46 consists of a female member 47 and a male member 48. The female member 47 is secured to the intermediate strip 29 by the screw 19 as can be seen in FIGURE 2. The male member extends through a hole 50 which is formed by the two portions 31b and 32b of the cover sections 31 and 32 intermediate the end portions 31a and 32b and the side walls 26. The male member 48 is provided with a pair of ears 51 and a knob 52. The ears are below the knob 52 and extend diametrically from the male member and overlie the cover sections 31*b* and 32*b* to hold the cover sections in place when the male member is locked in position within the female member 47.

Cooperative locking means is carried by the female member 47 and the male member 48. Such locking means can take the form of any of the embodiments shown in the copending application Ser. No. 624,012, filed Mar. 17, 1967. For example, as disclosed in FIGURE 20, therein, a maze 53 can be provided in the female member and three equally spaced wedge-shaped projections 54 can be provided on the male member. Three entrance slots or recesses 56 are provided in the female member 47 and are always exposed within the hole 50 to permit the projecttions 54 of the male member to be moved into the maze 53 carried by the female member.

The portions 31*b* and 32*b* are formed so as to provide recesses 57 with which the ears 51 can be moved into registration to permit the cover sections 31 and 32 to be opened.

The safety cover or enclosure 11 can be readily mounted upon a conventional cover plate for an electrical outlet by removing the screw 19 and then inserting the screw 19 through the female member 47 after the male member 48 has been removed and utilizing the same screw to secure the safety cover 11 to the outlet. Thus, it can be seen that no changes need be made in the electrical outlet to receive the safety cover. After the safety cover has been put in place by the screw 19, the cover sections 31 and 32 can be moved to the closed position and the male member 48 inserted in the female member and locked in position to hold the covers in place in engagement with the top end of the female member 47 as shown in FIGURE 2.

It may be desirable to also cover the small openings 36. If such is the case, a small cover plate 61 is mounted on each of the cover sections 31 and 32. The cover plate 61 is pivotally mounted on the pivot pin 62 and is yieldably held in a closed position by a spring 63, one end of which engages a projection 64 provided on the cover plate and the other end of which engages a pin 66 provided on the cover plate. The spring urges the cover plate into engagement with a projection 67 carried by the cover plate and prevents movement of the cover plate 61 beyond the position in which it covers the opening 36. When the small holes 36 are also closed by the covers 61, the child cannot even gain access to the interior of the safety cover or enclosure 11.

When it is desired to insert a power plug in the electrical outlet, the male member 48 is retracted in the manner described in copending application Ser. No. 624,012, filed Mar. 17, 1967, and the cover sections 31 and 32 are opened. The plug is then inserted into the female outlet 16 and the cord 41 is placed in the hole 36. The cover sections 31 and 32 are then pivoted into their closed positions. Thereafter, the male member 41 is repositioned in the female member 47 by pushing it inward so that the ears 51 engage the cover sections to lock the cover sections in place. Thus, it can be seen that the safety cover permits the electrical outlet to be utilized in a conventional manner with or without plugs in the electrical outlet, while at the same time preventing children from accidentally removing the plug or plugs or from gaining access to the electrical outlet. The ears 51 are in 12 and 6 o'clock positions when the male and female members are locked or fastened together and are out of registration with the notches 57. The locking means utilized has a maze which is sufficiently difficult so that it cannot be opened by a small child but which can be readily solved by an adult. A plug can be removed by an adult from the safety cover by moving the male member so that the wedges 54 travel through the maze and go into the over-travel position in the maze so that the ears 51 are in the 11 and 5 o'clock positions and in registration with the notches 57 to permit the cover sections 31 and 32 to be opened.

From the foregoing, it can be seen that the safety cover or enclosure is very versatile and protects children from electrical outlets and also can be utilized with cords connected to the outlet. In addition, the safety cover or enclosure is of relatively simple construction and can be inexpensively manufactured. Also, it permits mounting upon conventional electrical outlets without modification of the same.

I claim:

1. In a safety cover for an electrical outlet having a box and a cover plate secured to the box, a base portion, means securing said base portion to said box and overlying said cover plate, cover means pivotally secured to said base portion and enclosing the outlet openings in said plate, and removable locking means secured to said base portion and said cover means for preventing opening of said cover means, said cover means being formed to provide a space between the cover means and the plate to accommodate a plug mounted in one of the outlets, said cover means having at least one opening therein through which the cord for the plug can extend.

2. A safety cover as in claim 1 wherein said cover means is formed of at least two sections movable between open and closed positions and which in a closed position form said opening for said cord and wherein said removable locking means engages said two cover sections to prevent movement of the same to an open position.

3. A safety cover as in claim 1 which is dimensioned so that the plug cannot be disconnected from the outlet while said cover means is in a closed position.

4. In a safety cover for an electrical outlet having a box and a cover plate secured to the box, a base portion, means securing said base portion to said box in such manner that said base portion overlies said cover plate, cover means secured to said base portion and enclosing the outlet openings in said plate, said cover means being formed of at least two sections movable between open and closed positions, and removable locking means, said removable locking means comprising male and female members wherein one of said male and female members is secured to said base portion and wherein the other of said male and female members is formed with means adapted to engage the cover sections to retain the same in a closed position, said cover means being formed to provide a space between the cover means and the plate to accommodate a plug mounted in one of the outlets, said cover means having at least one opening therein through which the cord for the plug can extend.

5. In a safety cover for an electrical outlet having a box and a cover plate secured to the box, a base portion, means securing said base portion to said box in such manner that said base portion overlies said cover plate, cover means secured to said base portion and enclosing the outlet openings in said plate, said cover means being formed of at least two sections movable between open and closed positions, removable locking means secured to said base portion and said cover means for preventing opening of said cover means, and means pivotally mounting the cover sections to permit ready access to the electrical outlets when he cover sections are moved to an open position, said cover means being formed to provide a space between the cover means and the plate to accommodate a plug mounted in one of the outlets, said cover means having at least one opening therein through which the cord for the plug can extend.

6. In a safety cover for an electrical outlet having a box and a cover plate secured to the box, a base portion, means securing said base portion to said box in such manner that said base portion overlies said cover plate, cover means secured to said base portion and enclosing the openings in said plate, said cover means including a pair of spaced parallel side walls secured to said base portion and first and second cover sections pivotally mounted on said side walls, and removable locking means secured to said base portion and said cover means for preventing opening of said cover means, said cover means being formed to provide a space between the cover means and the plate to accommodate a plug mounted in one of the outlets, said cover means having at least one opening therein through which the cord for the plug can extend.

7. In a safety cover for an electrical outlet having a box and a cover plate secured to the box, a base portion, means securing said base portion to said box in such manner that said base portion overlies said cover plate, cover means secured to said base portion and enclosing the outlet openings in said plate, and removable locking means secured to said base portion and said cover means for preventing opening of said cover means, said cover means being formed to provide a space between the cover means and the plate to accommodate a plug mounted in one of the outlets, said cover means having at least one opening therein through which the cord for the plug can extend, together with a cover plate mounted on said cover means and means mounted on said cover plate yieldably urging said cover plate into a position which closes the opening in said cover means.

References Cited

UNITED STATES PATENTS

| | | | |
|---|---|---|---|
| 2,761,112 | 8/1956 | Torcivia | 174—67 X |
| 2,880,264 | 3/1959 | Ruskin | 174—67 |
| 3,067,402 | 12/1962 | Thaw | 174—67 X |

LEWIS H. MYERS, Primary Examiner

D. A. TONE, Assistant Examiner

U.S. Cl. X.R.

220—24.3; 339—37